July 19, 1955  G. D. STAPLETON  2,713,482
WASHER ASSEMBLY
Filed Feb. 20, 1952
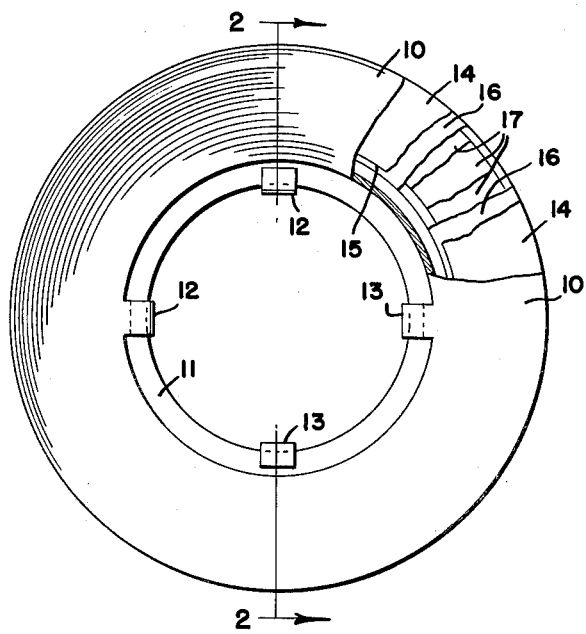
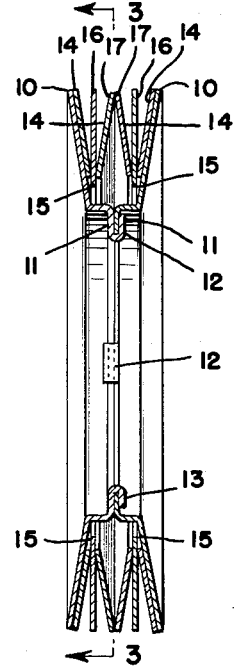
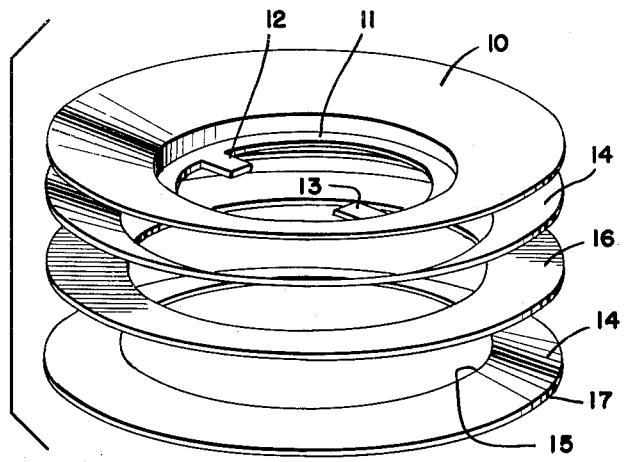
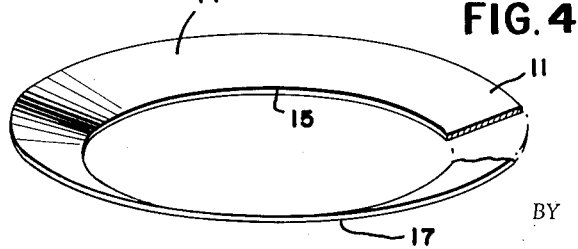
FIG. 1.
FIG. 2.
FIG. 3.
FIG. 4.
INVENTOR
GLENN D. STAPLETON
BY *George Sipkin*
ATTORNEY

United States Patent Office 2,713,482
Patented July 19, 1955

2,713,482

WASHER ASSEMBLY

Glenn D. Stapleton, Fort Wayne, Ind., assignor to the United States of America as represented by the Secretary of the Navy Application February 20, 1952, Serial No. 272,646

3 Claims. (Cl. 267—1)

This invention relates to a washer assembly for resilient metal washers bearing one against the other and against intermediate separating washers and has as an object therefor to provide a convenient, inexpensive washer assembly.

For a more complete understanding of this invention together with other objects and advantages thereof reference is had to the accompanying drawing in which Figure 1 is a plan view partly in cross-section of the washer assembly; Figure 2 is a cross sectional view taken along lines 2—2 of Figure 1; Figure 3 is an exploded view of the section of the washer assembly to the right of lines 3—3 of Figure 2; and Figure 4 is a plan view partly in cross section of a resilient metal washer. Similar elements in each view have been identified by the same identifying numeral.

Referring more particularly to Figure 1, 10 indicates each of a pair of annular retainers each having a recessed flange 11 in the central portion thereof and ears 12 and 13 protruding from the flange at opposite sides thereof. The retainers 10 have sides which slope outward from the central portion as indicated in Figure 2 and are clamped together by folding the ears 12 and 13 over the flanges 11 at portions adjacent thereto.

A plurality of annular resilient metal washers 14 having sides which slope outward from the inner edge 15 thereof and having an inner diameter greater than the diameter of the central portion of the retainers 10 are mounted in the space between the sloping sides of the retainers 10 and one of the resilient metal washers 14 is in contiguous relationship with the sloping wall of each of the retainers 10. The inner edge 15 of each of the metal washers 14 bears against an intermediate floating washer 16 having an inner diameter slightly smaller than the inner diameter of the resilient metal washers 14.

The resilient metal washers 14 and the intermediate floating washers 16 are positioned between the sloping walls of the retainers 10 to form a washer assembly in which the retainers 10 are bound together by the ears 12 and 13 and a resilient metal washer 14 is in contiguous relationship with the inner sloping wall thereof. An intermediate floating washer 16 is clamped between the inner edge 15 of the resilient metal washer 14 in contiguous relation with the sloping wall of the retainers 10 and the inner edge 15 of a second resilient metal washer 14 which is positioned against another of the resilient metal washers 14 so that the outwardly sloping sides face one another.

Figure 3 is an exploded view of the washer assembly and shows a retainer 10, a resilient metal washer 14, an intermediate floating washer 16, and a second resilient metal washer 14. The retainer 10 and the washers 14, 16, 14 are combined with a similar retainer 10 and washers 14, 16, 14 so that the sloping walls of the second resilient washer 14 face one another and the ears 12 and 13 of the retainer 10 clamp the retainers together with the washers between the outwardly sloping walls thereof to form a washer assembly. Figure 4 is a plan view of one of the annular resilient metal washers 14 having an inner edge 15 and an outer circumferential edge 17 and walls which slope outward from the inner edge.

In the embodiment of the invention illustrated and described one of the washers 14 is in contiguous relation with each of the sloping walls of the retainers 10 and the outer circumferential edge 17 of another of the resilient metal washers 14 bear against the outer circumferential edge 17 of another resilient metal washer 14 so that the washer walls are sprung apart and the inner edges 15 of the washers 14 which have sprung apart walls bear against an intermediate floating washer 16 which also bears against the inner edges 15 of the resilient metal washers in contiguous relationship with the sloping walls of the retainers 10. The ears 12 and 13 of the retainers 10 bind the retainers 10 together with the resilient metal washers 14 and the intermediate floating washers 16 between the sloping walls thereof to form a washer assembly. The assembled washer is in the nature of a disc spring with the outer edges of the parts movable inwardly.

The flat washers 16 serve to prevent relative movement or misalignment of the adjacent spring washers when the assembly is compressed. If the washers 16 were not present in the assembly, relative movement would occur between the spring washers due to the fact that there is only a line contact engagement between them along the edge of the central aperture of each washer. Such movement of the spring washers would reduce the amount of tension the washer assembly could exert on an object to which it is affixed. Substantial movement of the spring washers could occur under the assumed conditions due to the fact that the central aperture of each spring washer is larger than the central aperture of the annular end members or retainers 10. The retainers 10 serve as a means for securing a plurality of spring washers in a suitable package, the spring washers being generally referred to in the art as "Belleville washers".

While the invention disclosed is illustrated in a preferred embodiment thereof, I intend in the appended claims to cover such other embodiments as reasonably fall within the spirit and scope of my invention.

What I claim as new and desire to secure by Letters Patent of the United States is:

1. A resilient metal washer assembly comprising in combination, a first and second dished resilient annular retainer having recessed central portions approximately of equal diameters and a plurality of ears protruding from each of the central portions and engaging the other of the central portions to attach said retainers one to the other, a plurality of resilient metal washers assembled between said retainers and each having an inner diameter greater than the diameter of the central portions of said retainers, and a plurality of intermediate floating washers spaced between said dished resilient metal washers each of said floating washers being disposed between an adjacent pair of resilient metal washers the inner edges of which are contiguous.

2. A resilient metal washer assembly comprising in combination, a first and second dished resilient annular retainer having recessed central portions approximately of equal diameters and a plurality of ears protruding from each of the central portions and engaging the other of the central portions to attach said retainers one to the other, a first pair of annular resilient metal washers each having an inner diameter greater than the diameter of said central portion and assembled between and resting against said retainers, a second pair of resilient metal washers assembled between said first pair of metal washers and having an inner diameter approximately the same as said first pair of resilient metal washers and having outer circumferential edges bearing one against the other, and a pair of intermediate floating washers between said first and second pairs of resilient metal washers within said retainers.

3. A resilient metal washer assembly comprising in combination, a first and second dished resilient annular retainer having recessed central portions approximately of equal diameters and a plurality of ears protruding from each of the central portions and engaging the other of the central portions to attach said retainers one to the other, a first pair of annular resilient metal washers each having an inner diameter greater than the diameter of the central portions and assembled between and resting against said retainers, and a pair of dished resilient metal washers having an inner diameter approximately the same as said first pair of resilient metal washers and assembled between said first pair of washers with their concave surfaces face to face and having their outer circumferential edges bearing one against the other.

References Cited in the file of this patent

UNITED STATES PATENTS

| 2,464,152 | Ralston | Mar. 8, 1949 |

FOREIGN PATENTS

| 27,376 | Great Britain | of 1910 |
| 141,675 | Great Britain | Dec. 16, 1920 |
| 891,650 | France | Dec. 11, 1943 |